United States Patent
Oida et al.

(10) Patent No.: US 8,027,227 B2
(45) Date of Patent: Sep. 27, 2011

(54) OPTICAL DISC APPARATUS

(75) Inventors: Nobuyuki Oida, Tokorozawa (JP); Tsuyoshi Yamamoto, Ota (JP)

(73) Assignees: Sanyo Electric Co., Ltd., Osaka (JP); Sanyo Optec Design Co. Ltd., Tokyo (JP)

( * ) Notice: Subject to any disclaimer, the term of this patent is extended or adjusted under 35 U.S.C. 154(b) by 1 day.

(21) Appl. No.: 12/767,691

(22) Filed: Apr. 26, 2010

(65) Prior Publication Data

US 2010/0271916 A1 Oct. 28, 2010

(30) Foreign Application Priority Data

Apr. 27, 2009 (JP) ................... 2009-108028
Jun. 17, 2009 (JP) ................... 2009-144029

(51) Int. Cl.
*G11B 7/00* (2006.01)
(52) U.S. Cl. ............. 369/44.23; 369/47.49; 369/47.55
(58) Field of Classification Search ................ None
See application file for complete search history.

(56) References Cited

U.S. PATENT DOCUMENTS

| | | | | |
|---|---|---|---|---|
| 7,257,070 B2* | 8/2007 | Kobayashi | ................ | 369/53.22 |
| 2002/0101799 A1* | 8/2002 | Nishikawa | ................ | 369/44.23 |
| 2002/0126589 A1* | 9/2002 | Osada et al. | ................ | 369/44.23 |
| 2003/0007431 A1* | 1/2003 | Tateishi | ................ | 369/44.23 |
| 2005/0025000 A1* | 2/2005 | Ariyoshi et al. | ................ | 369/44.32 |
| 2007/0008836 A1* | 1/2007 | Imagawa et al. | ................ | 369/44.23 |
| 2008/0080337 A1* | 4/2008 | Kamioka | ................ | 369/44.23 |
| 2010/0271916 A1* | 10/2010 | Oida et al. | ................ | 369/47.38 |

FOREIGN PATENT DOCUMENTS

JP 2007-328875 12/2007

\* cited by examiner

*Primary Examiner* — Peter Vincent Agustin
(74) *Attorney, Agent, or Firm* — SoCal IP Law Group LLP; Steven C. Sereboff; John E. Gunther

(57) ABSTRACT

An optical-disc apparatus comprising: a laser-light source; an objective lens; an aberration-correction lens to be moved in an optical-axis direction according to a cover-layer thickness of an optical disc; a stepping motor; a driving unit to generate a driving pulse for the motor; a storage unit to store current-position information of the aberration-correction lens based on the number of the pulse; and a control unit to control the driving unit so that the aberration-correction lens is moved between a first position set in a mechanical-movable range of the aberration-correction lens and a second position set on the objective-lens side relative to the first position, the driving unit being controlled so that the aberration-correction lens is moved to the second position when stop of disc rotation occurs, and is moved to a start position between the first-and-second positions according to the thickness based on the information when the stop is cancelled.

8 Claims, 8 Drawing Sheets

| Phase | EXCITATION PATTERN | | | |
|---|---|---|---|---|
| | 1 | 2 | 3 | 4 |
| A+ | H | H | L | L |
| A- | L | L | H | H |
| B+ | H | L | L | H |
| B- | L | H | H | L |
| CW | →→→→→→→→→→→ | | | |
| CCW | ←←←←←←←←←←← | | | |

FIG. 4

OPTICAL DISC APPARATUS

CROSS-REFERENCE TO RELATED APPLICATIONS

This application claims the benefit of priority to Japanese Patent Application Nos. 2009-108028 and 2009-144029, filed Apr. 27, 2009 and Jun. 17, 2009, respectively, of which full contents are incorporated herein by reference.

BACKGROUND OF THE INVENTION

1. Field of the Invention

The present invention relates to an optical disc apparatus that controls a lens driving mechanism for driving an aberration correction lens in an optical axis direction according to a thickness of a cover layer of an optical disc.

2. Description of the Related Art

As an optical disc, a so-called multilayer optical disc is known such as Blu-ray Disc and DVD (Digital Versatile Disc), in which a recording layer is formed in a multilayered form. In such a multilayered disc, spherical aberration occurs in laser light converging to a recording layer due to a difference in thickness of a cover layer from a laser-light incident face to the recording layer among recording layers. Thus, especially in a multilayer optical disc such as Blu-ray Disc having improved recording density, the spherical aberration causes a failure in recording and reproducing, and thus, a lens driving mechanism is provided that is capable of driving an aberration correction lens in an optical axis direction according to the thickness of the cover layer of the optical disc in an optical pickup supporting the multilayer optical disc.

An optical disc apparatus including an optical pickup supporting a multilayered optical disc controls the lens driving mechanism so that the aberration correction lens is displaced in the optical axis direction corresponding to a recording layer for which recording and reproducing for the multilayer disc is performed.

The lens driving mechanism employs a stepping motor as a driving source for the aberration correction lens in general, and is configured such that a driving pulse for driving the stepping motor is generated from a motor driving circuit included in the optical disc apparatus so that the aberration correction lens is displaced in the optical axis direction. Also, lens control means for controlling the motor driving circuit is included in the optical disc apparatus, and the motor driving circuit is controlled by the lens control means to generate the driving pulse for driving the stepping motor.

The optical disc apparatus needs to grasp a displacement position of the aberration correction lens in order to control the aberration correction lens of the lens driving mechanism. The optical pickup includes a position detection element such as a photo interrupter as shown in Japanese Patent Laid-Open Publication No. 2007-328875, for example, so as to be capable of detecting that the aberration correction lens is displaced to a reference position, and measures a distance from the reference position, to control the displacement position of the aberration correction lens.

As mentioned above, if the optical pickup is configured including a position detection element for detecting a reference position of the aberration correction lens, the position of the aberration correction lens can be controlled based on the reference position.

However, provision of the position detection element in the lens driving mechanism involves an increase in the number of components and of assembling processes, which is disadvantageous in terms of cost. Thus, a lens driving mechanism without the position detection element is required, however, if there is no position detection element, it is necessary that a reference position of the aberration correction lens is set to one of mechanical movable limits of the aberration correction lens in the lens driving mechanism and that the aberration correction lens is reliably pressed onto the one of the mechanical movable limits of the lens driving mechanism to be displaced to the reference position.

If the aberration correction lens is pressed onto the mechanical movable limit of the lens driving mechanism, a mechanical load is applied to the lens driving mechanism, which causes deterioration in durability of the lens driving mechanism. The mechanical load of the lens driving mechanism is in proportion to a length of a time period during which the aberration correction lens is pressed onto the mechanical movable limit of the lens driving mechanism and to magnitude in kinetic energy of the pressing. Thus, when the aberration correction lens is returned to the reference position, it is necessary to reduce the length of the time period during which the aberration correction lens is pressed onto the mechanical movable limit of the lens driving mechanism as much as possible and to reduce the kinetic energy of the pressing as much as possible.

SUMMARY OF THE INVENTION

An optical disc apparatus according to an aspect of the present invention comprises: a laser light source configured to emit laser light; an objective lens configured to allow the laser light to be applied to a recording layer of an optical disc; an aberration correction lens arranged in an optical path between the laser light source and the objective lens, the aberration correction lens configured to be moved in an optical axis direction according to a thickness of a cover layer of the optical disc from an incident face to the recording layer; a stepping motor configured to drive the aberration correction lens; a driving unit configured to generate a driving pulse for driving the stepping motor; a storage unit configured to store current position information of the aberration correction lens based on the number of the driving pulse; and a control unit configured to control the driving unit so that the aberration correction lens is moved between a first position set in a mechanical movable range of the aberration correction lens and a second position set on the objective lens side with respect to the first position, the control unit controlling the driving unit so that the aberration correction lens is moved to the second position, when rotation of the optical disc is stopped, and controlling the driving unit so that the aberration correction lens is moved to a start position between the first position and the second position according to the thickness of the cover layer based on the current position information of the aberration correction lens, when stop of the rotation of the optical disc is cancelled.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which:

FIG. 4 is an explanatory diagram for explaining an excitation pattern of a driving pulse for driving a stepping motor 24;

DETAILED DESCRIPTION OF THE INVENTION

Figure 1:
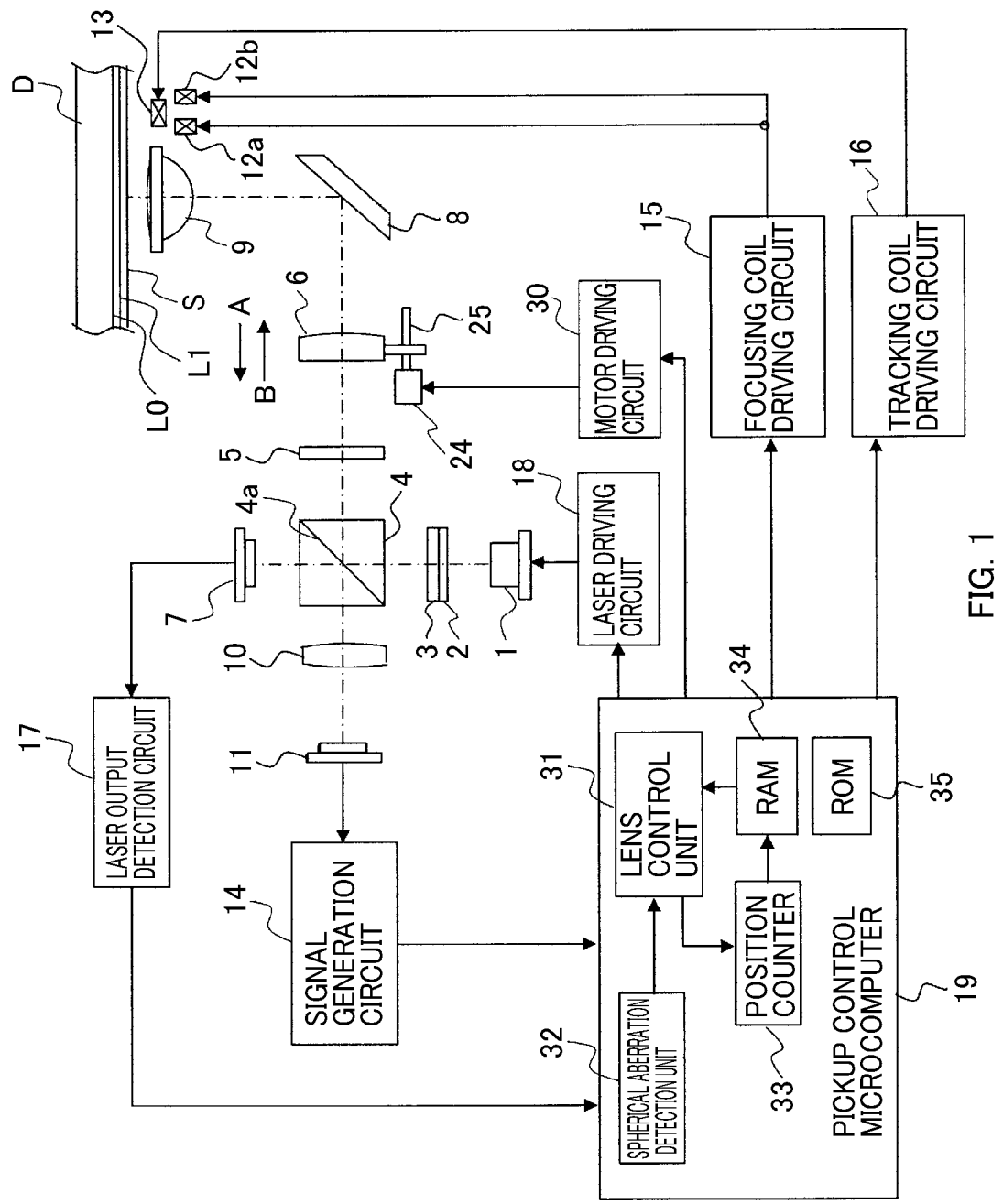
FIG. 1 is a circuit block diagram illustrating an optical disc apparatus according to an embodiment of the present invention.

At least the following details will become apparent from descriptions of this specification and of the accompanying drawings.

An optical disc apparatus according to an embodiment of the present invention, which will be described below, controls a lens driving mechanism provided in an optical pickup, in which an aberration correction lens is arranged between a laser light source and an objective lens in such a manner as to be capable of being displaced in an optical axis direction according to a thickness of a cover layer of an optical disc from an incident face to a recording layer, so as to drive the aberration correction lens by a stepping motor; a motor driving circuit that generates a driving pulse for driving the stepping motor is controlled by a lens control unit, and the lens control unit that controls the motor driving circuit so that the aberration correction lens is displaced to a standby position when rotation of the optical disc is stopped, as well as generates from the motor driving circuit a driving pulse in such a direction as to return the lens to the reference position and the pulse of such a pulse number as to be required for returning the aberration correction lens at the standby position to the reference position when the aberration correction lens is returned to the reference position; and the standby position is set within a mechanical movable limit of the aberration correction lens in the lens driving mechanism so as to include a movable required range of the aberration correction lens between the standby position and the reference position.

An optical disc apparatus according to an embodiment of the present invention: controls the aberration correction lens of the optical pickup in which the aberration correction lens is driven in the optical axis direction according to the thickness of the cover layer of a multilayer optical disc having recording layers in a multilayered form; the standby position is set at a boundary position, which is the farthest from the reference position, of the movable range of the aberration correction lens including all the movable required range of the aberration correction lens assumed to be required for applying laser light from the optical pickup to each of all the recording layers in the multilayered optical disc in an optimal manner; and the aberration correction lens is controlled by the lens control unit with the standby position as a boundary of the movable range.

In an optical disc apparatus according to an embodiment of the present invention, the stepping motor of the lens driving mechanism is driven by a two-phase excitation method, and the pulse number required for returning the aberration correction lens at the standby position to the reference position is set to the pulse number obtained by adding 3 pulses to the pulse number corresponding to a calculated movable amount required for driving the aberration correction lens for a distance from the standby position to the reference position.

In an optical disc apparatus according to an embodiment of the present invention, the reference position is one of mechanical movable limits of the aberration correction lens in the lens driving mechanism.

In an optical disc apparatus according to an embodiment of the present invention, the aberration correction lens is displaced to the reference position under control by the lens control unit when power supply is turned on.

In an optical disc apparatus according to an embodiment of the present invention, when the aberration correction lens is returned to the reference position, a driving pulse generated from the motor driving circuit is controlled by the lens control unit so that a movement speed of the aberration correction lens is lowered immediately before the lens reaches the reference position.

In an optical disc apparatus according to an embodiment of the present invention, the stepping motor of the lens driving mechanism is driven by the two-phase excitation method, and when the aberration correction lens located at the standby position is returned to the reference position, an initial excitation pattern of the driving pulse generated from the motor driving circuit is fixed to a predetermined excitation pattern, and the pulse number required for returning the aberration correction lens at the standby position to the reference position is set to the pulse number corresponding to a calculated movable amount required for driving the aberration correction lens from the standby position to the reference position.

An optical disc apparatus according to an embodiment of the present invention: controls the aberration correction lens of the optical pickup in which the aberration correction lens is driven in the optical axis direction according to the thickness of the cover layer of the multilayer optical disc having recording layers in the multilayered form; sets a reference position, which is to be a displacement reference of the aberration correction lens, to one end of a mechanical movable limit of the aberration correction lens; sets a standby position to a position farthest from the reference position in a range where the aberration correction lens is driven, including all the movable required range of the aberration correction lens assumed to be required for applying the laser light from the optical pickup to each of all the recording layers in the multilayer optical disc in an optimal manner between the standby position and the reference position; the aberration correction lens is displaced to the standby position when recording in the optical disc or reproducing therefrom is stopped; and when initialization processing of the aberration correction lens is started, the aberration correction lens is driven for a distance required for being returned from the standby position to the reference position to be displaced to the reference position, and the aberration correction lens having been displaced to the reference position is driven toward the standby position direction to be displaced to a position suitable for recording in the optical disc or reproducing therefrom.

An optical disc apparatus according to an embodiment of the present invention controls driving of the aberration correction lens so that the movement speed of the aberration correction lens is reduced immediately before the aberration correction lens reaches the reference position, when the lens is returned to the reference position.

In an optical disc apparatus according to an embodiment of the present invention, an aberration correction lens is arranged between a laser light source of an optical pickup and an objective lens so as to be capable of being displaced in an optical axis direction according to a thickness of a cover layer of an optical disc, a lens driving mechanism is provided for driving the aberration correction lens, a stepping motor is provided as a driving source for driving the aberration correction lens of the lens driving mechanism, a motor driving circuit for generating a driving pulse for driving the stepping motor is controlled by a lens control unit, and when rotation of the optical disc is stopped the motor driving circuit is controlled by the lens control unit so that the aberration correction lens is displaced to a standby position that is set within a mechanical movable limit of the aberration correction lens in the lens driving mechanism so as to include a movable required range of the aberration correction lens between the standby position and the reference position, and a driving pulse is generated from the motor driving circuit whose direction is such a direction as to return the lens to the reference position and whose pulse number is required for returning the aberration correction lens at the standby position to the reference position when the aberration correction lens is returned to the reference position.

According to such a configuration of the optical disc apparatus as above, the pulse number required for returning the aberration correction lens at the standby position set in advance to the reference position can be set in a fixed manner, the standby position is set at a predetermined position which is farthest from the reference position within the mechanical movable limit of the aberration correction lens in the lens driving mechanism, and since the aberration correction lens is often returned to the reference position during spin-down when recording/reproducing for the optical disc is stopped and rotation of the optical disc is stopped, the aberration correction lens is driven by the driving pulse in such a direction as to be returned to the reference position and the pulse of such a pulse number as to be required for returning the aberration correction lens located at the standby position to the reference position when the aberration correction lens is returned to the reference position, so that the lens can be displaced to the reference position as well as the driving pulse number can be reduced by which the aberration correction lens is pressed onto the mechanical movable limit of the lens driving mechanism after having been displaced to the reference position.

In an optical disc apparatus according to an embodiment of the present invention, the reference position, which is to be a reference of displacement of the aberration correction lens driven in the optical axis direction according to the thickness of the cover layer of the multilayer optical disc having a recording layers of a multilayered form, is set at one end of the mechanical movable limit of the aberration correction lens; a standby position including, between the standby position and the reference position, all the movable required range of the aberration correction lens assumed to be required for applying the laser light from an optical pickup to each of all the recording layers in the multilayer optical disc in an optimal manner is set at a position farthest from the reference position in a range where the aberration correction lens is driven; the aberration correction lens is displaced to the standby position when recording into the optical disc or reproducing therefrom is stopped; the aberration correction lens is driven to be displaced to the reference position for a distance required for being returned from the standby position to the reference position when initialization processing of the aberration correction lens is started; and the aberration correction lens having been displaced to the reference position is driven toward the standby position direction to be displaced to a position suitable for recording in the optical disc or reproducing therefrom. According to such a lens control method as above, the aberration correction lens can be displaced to the reference position by being driving for a distance required for returning the aberration correction lens at the standby position to the reference position when the aberration correction lens is returned to the reference position, as well as such a load as to be pressed onto the mechanical movable limit of the aberration correction lens can be reduced when the aberration correction lens is displaced to the reference position.

According to an optical disc apparatus according to an embodiment of the present invention, using a lens driving mechanism without a position detection element, the aberration correction lens can be displaced to the reference position by reliably pressing the lens onto one of the mechanical movable limits of the lens driving mechanism, as well as, a mechanical load can be reduced which is applied to the lens driving mechanism when the aberration correction lens is displaced to the reference position.

Embodiment 1

FIG. 1 is an explanatory diagram illustrating an optical system of an optical pickup and a circuit block showing a circuit configuration and of an optical disc apparatus according to an embodiment of the present invention. In an embodiment of the present invention, there will be described, as an example, an optical disc apparatus for recording/reproducing data and a lens control method, for a two-layer optical disc including two recording layers L0, L1 supporting the Blu-ray Disc (hereinafter abbreviated as BD) standard.

Blue-violet laser light at a BD compatible wavelength (405 nm, for example) emitted from a laser diode 1, which is a laser light source, is diffracted into three beams so as to generate ±1st order diffracted light, which are used by a diffraction grating 2 for tracking control by a differential push-pull method and focus control by a differential astigmatism method, and thereafter, a polarization direction of linear polarized light is adjusted by a half-wave plate 3, which is formed integrally with the diffraction grating 2, to be applied to a polarizing beam splitter 4.

On a filter face 4a of the polarizing beam splitter 4, a polarizing film is formed for reflecting most of the laser light having passed through the half-wave plate 3, and most (95% or more, for example) of the laser light applied to the polarizing beam splitter 4 is reflected by the filter face 4a to be led to a collimating lens 6 (aberration correction lens) through a quarter-wave plate 5, and a part (less than 5%, for example) of the laser light passes through the filter face 4a to be received by a front monitor diode 7.

The front monitor diode 7 generates a monitor output on the basis of a received light amount of the laser light received thereby, and the monitor output is detected by a laser output detection circuit 17. A laser driving circuit 18 for driving the laser diode 1 is controlled by a pickup control microcomputer 19 so that the monitor output detected by the laser output detection circuit 17 is controlled so as to be a predetermined constant amount, and thus, the laser light emitted by the laser diode 1 is kept at a predetermined light amount according to the monitor output.

The laser light reflected by the filter face 4a of the polarizing beam splitter 4 passes through the quarter-wave plate 5 to be polarized into a circular polarized light, and thereafter, the polarized light is led to the collimating lens 6 to be collimated by the collimating lens 6 to substantially parallel light, and led to a reflective mirror 8.

The laser light having reached the reflective mirror 8 is reflected and refracted by the reflective mirror 8 so as to enter an objective lens 9, and is collected by the objective lens 9 with a NA of 0.85 compatible with the BD to be applied to a predetermined recording layer of an optical disc D.

The laser light modulated and reflected by the recording layer of the optical disc D is returned to the objective lens 9, travels the same optical path as an onward path in the opposite direction, is reflected by the reflective mirror 8 to be refracted, is returned to the collimating lens 6, and then, passes through the quarter-wave plate 5 again. The laser light passes through the quarter-wave plate 5 twice onward and backward, that is, the linear polarization direction is rotated by 90 degrees with the onward path and the backward path, and the laser light, which is s-polarized light on the onward path to the optical disc D, becomes p-polarized light on the backward path. The p-polarized laser light reaches the polarizing beam splitter 4. Since the filter face 4a of the polarizing beam splitter 4 has such a film characteristic as to allow almost all the p-polarized laser light to pass therethrough, the laser light returned to the polarizing beam splitter 4 passes through the polarizing beam splitter 4, and is given by an anamorphic lens 10 astigmatism, which is to be a focus error component indicating a focus deviation of the laser light with respect to the recording layer of the optical disc D, as well as has its focal distance adjusted, to be led to a photodetector 11.

The photodetector 11 receives a light receiving spot including the focus error component, a tracking error component, and a radial tilt error component.

Each light receiving output obtained from each light receiving segment (not shown) constituting a light receiving portion of the photodetector 11 is supplied to a signal generation circuit 14, and the signal generation circuit 14 performs predetermined operation processing for each light receiving output to generate an information data signal (RF signal), a focus error signal, a tracking error signal, and a radial tilt error signal of the optical disc D.

The RF signal, the focus error signal, the tracking error signal, and the radial tilt error signal are supplied to the pickup control microcomputer 19, and the pickup control microcomputer 19 generates a focus control signal for controlling a focusing coil driving circuit 15 on the basis of the focus error signal and the radial tilt error signal, and generates a tracking control signal for controlling a tracking coil driving circuit 16 on the basis of the tracking error signal.

The objective lens 9 is mounted on a lens holder (not shown) making up a movable portion of an objective lens driving device (not shown), and one pair of focusing coils 12a and 12b and a tracking coil 13, for example, are fixed to the lens holder. The pair of focusing coils 12a and 12b are arranged on the lens holder side by side in a radial direction of the optical disc D, and the objective lens 9 is displaced (moved) in a focus direction by an amount equal in magnitude between the focus control signals supplied to the focusing coils 12a and 12b, respectively, as well as is inclined in a radial tilt direction by an amount different in magnitude between the focus control signals.

The focusing coils 12a and 12b are supplied with focus control signals from the focusing coil driving circuit 15, respectively, and the tracking coil 13 is supplied with the tracking control signal from the tracking coil driving circuit 16.

Thus, the objective lens 9 is focus-controlled and radial-tilt-controlled by the focus control signal including the focus error signal component and the radial tilt error signal component, and is also tracking-controlled by the tracking control signal, to be driven by the objective lens driving apparatus.

Figure 2:
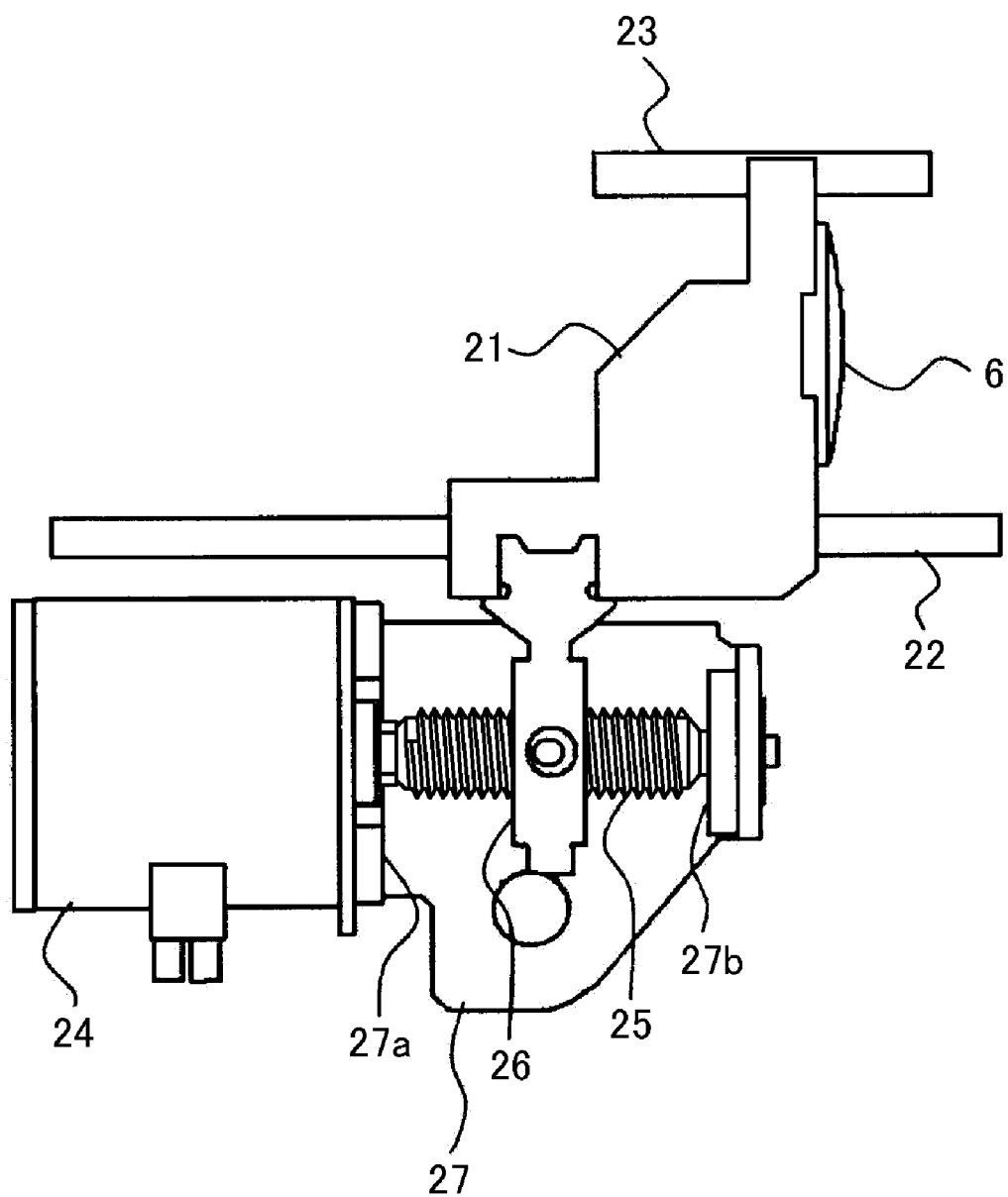
FIG. 2 is a configuration diagram illustrating a lens driving mechanism included in an optical pickup illustrated in FIG. 1.

The collimating lens 6 is driven by the lens driving mechanism in the optical axis direction. FIG. 2 illustrates a lens driving mechanism. In FIG. 2, the collimating lens 6 is held by a holding member 21, and the holding member 21 is supported in a manner movable in the optical axis direction by a main guide rail 22 and a sub guide rail 23 that are fixed to a housing (not shown) incorporating optical components of the optical pickup. A feeding member 26 screwed by a feeding screw 25 which is rotated by a stepping motor 24 that is a driving source, is connected to the holding member 21. Therefore, when the feeding screw 25 is rotated by the stepping motor 24, the feeding member 26 is driven in the axial direction of the feeding screw 25 as well as the holding member 21 is allowed to slide along the guide rails 22 and 23, so that the collimating lens 6 is driven in the optical axis direction.

In the lens driving mechanism configured as above, a shaft supporting plate 27, including pivotal supporting portions 27a and 27b for pivotally supporting both ends of the feeding screw 25, respectively, is fixed to the stepping motor 24, and mechanical movable limits of the collimating lens 6 are to be such positions that the feeding member 26 is brought into contact with each of the pivotal supporting portions 27a and 27b, respectively.

Figure 3:
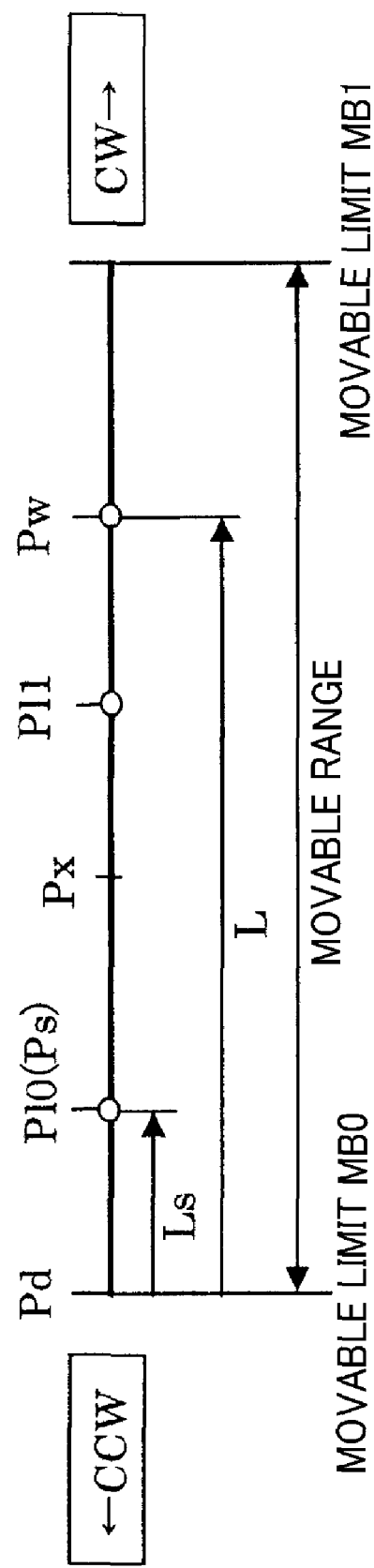
FIG. 3 is an explanatory diagram schematically illustrating a movable range of a collimating lens 6 in embodiments 1 and 2.

FIG. 3 is an explanatory diagram schematically illustrating a movable range of the collimating lens 6.

In the lens driving mechanism illustrated in FIG. 2, the collimating lens 6 is configured in a mechanically movable manner between a mechanical movable limit MB0 in a direction away from the objective lens 9 and a mechanical movable limit MB1 in a direction toward the objective lens 9, and an actual movable range of the collimating lens 6 is set by control by a lens control unit 31 (control unit) as a range between the one movable limit MB0 and a predetermined position Pw (standby position Pw, which will be described later), which is inside the other movable limit MB1, and within such a range, displacement positions P10 and P11 of the collimating lens 6 exist, which are suitable for recording/reproducing for recording layers L0 and L1 of the optical disc, respectively. The one movable limit MB0 of the collimating lens 6 on the side away from the objective lens 9 in the lens driving mechanism is a reference position Pd (first position) of the collimating lens 6.

The lens driving mechanism illustrated in FIG. 2 is driven by a motor driving circuit 30 (driving unit) that generates a driving pulse for driving the stepping motor 24, and is controlled by the lens control unit 31 that controls the motor driving circuit 30. Thus, the collimating lens 6 is displaced by the motor driving circuit 30 in the optical axis direction under the control by the lens control unit 31, and by the such displacement of the collimating lens 6, the laser light converging with the objective lens 9 is applied to the recording layer for recording/reproducing so as to correct the aberration corresponding to the cover layer thickness.

The control of the lens driving mechanism will, hereinafter, be described in detail.

The stepping motor 24 is driven by the two-phase excitation method and the motor includes terminals A+, A−, B+, and B−, each of which is supplied with each of driving pulses H (High) and L (Low) generated from the motor driving circuit 30 with excitation patterns 1 to 4 illustrated in FIG. 4. When each of the driving pulses H and L is supplied to each of the terminals A+, A−, B+, and B− from the motor driving circuit 30 in such a ascending order as 1, 2, 3, 4, 1, 2, ... of the excitation patterns as illustrated in FIG. 4, the stepping motor 24 is rotated in a direction of CW (Clock Wise), while when each of the driving pulses H and L is supplied to each of the terminals A+, A−, B+, and B− from the motor driving circuit 30 in such a descending order as 4, 3, 2, 1, 4, 3, ... of the excitation patterns shown in FIG. 4, the stepping motor 24 is rotated in a direction of CCW (Counter Clock Wise).

If the stepping motor 24 is rotated in the CW direction, the collimating lens 6 is driven in a direction (CW direction) toward the objective lens 9, while if the stepping motor 24 is rotated in the CCW direction, the collimating lens 6 is driven in a direction (CCW direction) away from the objective lens 9.

If each of the driving pulses H and L generated from the motor driving circuit 30 is constant, a rotation amount of the feeding screw 25 is set according to the driving pulse number supplied to the stepping motor 24, and thus, a displacement amount of the collimating lens 6 can be controlled according to the driving pulse number generated from the motor driving circuit 30. However, the driving pulse number here is the number of times that the driving pulses H and L are generated simultaneously from the motor driving circuit 30 corresponding to each of the excitation patterns illustrated in FIG. 4, and one excitation pattern corresponds to the driving pulse number "1".

Subsequently, a case will be described where the laser light from the optical pickup is applied to the recording layers L0 and L1 of the two-layer optical disc D.

When the optical disc apparatus is started, the lens control unit 31 generates the driving pulse from the motor driving circuit 30 so as to rotate the stepping motor 24 in the CW direction by such a pulse number that is converted into a distance from the reference position Pd to a starting position Ps using the reference position Pd as a reference "0" of the driving pulse number, and controls the collimating lens 6. Thus, the collimating lens 6 is driven so as to be displaced to the starting position Ps, which is set in advance as a starting point at the start. This starting position Ps is a position of the collimating lens 6 at which the laser light is not focused on the recording layer L0, and which is set in advance so that recording or reproducing for the recording layer L0 of the optical disc D is performed in an appropriate manner, for example.

If the laser light is applied to the recording layer L0 having a thicker cover layer, which is arranged more inside from the laser-light incident surface of the optical disc D as compared with the recording layer L1, the lens control unit 31 generates the driving pulse from the motor driving circuit 30 by such a pulse number that is converted into a distance from the starting position Ps to an L0 suitable position P10 suitable for the recording layer L0, in such a rotation direction that is set by a positional relationship between the starting position Ps and the L0 suitable position P10. Thus, the stepping motor 24 is driven by the driving pulse generated from the motor driving circuit 30, and the collimating lens 6 is displaced to the L0 suitable position P10, at which a quality is obtained of the laser light suitable for recording/reproducing for the recording layer L0 of the optical disc D.

In the case of the starting position Ps=L0 suitable position P10, there is omitted a control operation which is to be performed by the lens control unit 31 for displacing the collimating lens 9 from the starting position Ps to the L0 suitable position P10, and the lens control unit 31 shifts to a control operation for correcting spherical aberration by aberration correction processing, which will be described later, so as to correct the spherical aberration of the laser light applied to the recording layer L0.

On the other hand, if the laser light is applied to the recording layer L1 having a thinner cover layer, which is arranged more frontward from the laser-light incident surface of the optical disc D as compared with the recording layer L0, the lens control unit 31 generates the driving pulse from the motor driving circuit 30 by such a pulse number that is converted into a distance from the starting position Ps to an L1 suitable position P11 suitable for the recording layer L1, in such a rotation direction that is set by a positional relationship between the starting position Ps and the L1 suitable position P11. Thus, the stepping motor 24 is driven by the driving pulse generated from the motor driving circuit 30, and the collimating lens 6 is displaced to the L1 suitable position P11, at which a quality is obtained of the laser light suitable for recording/reproducing for the recording layer L1 of the optical disc D. That is, a focusing position of the collimating lens 6 when the laser light is focused on the recording layers L0 and L1 of the optical disc D is set between the reference position Pd and the standby position Pw.

Thereafter, the lens control unit 31 shifts to a control operation for correcting the spherical aberration by the aberration correction processing, which will be described later, so as to correct the spherical aberration of the laser light applied to the recording layer L1.

Here, when the lens control unit 31 shifts to the aberration correction processing, the lens control unit 31 is brought to such a state as to control the collimating lens 6 according to an amount of spherical aberration detected by a spherical aberration detection unit 32 that detects an amount of spherical aberration by detecting a level or a jitter value of an RF signal obtained from the signal generation circuit 14. Thus, the collimating lens 6 is displaced to an optimal position so that the amount of spherical aberration detected by the spherical aberration detection unit 32 becomes less than a predetermined value, and with such displacement, an angle of divergence of the laser light incident on the objective lens 9 is adjusted, and as a result, the spherical aberration is corrected of the laser light applied to the recording layer for recording/reproducing for the optical disc D.

Such a control operation of the spherical aberration correction will be described in detail.

There is such a characteristic that if the thickness of the cover layer provided between the recording layer of the optical disc D and the laser-light incident surface is greater than a standard, negative spherical aberration occurs, while if the thickness the cover layer is smaller, positive spherical aberration occurs. Therefore, if the thickness of the disc cover layer is greater, the collimate lens 6 is moved in the direction of the laser diode 1, that is, in an arrow-A direction so that the spherical aberration can be corrected, and to the contrary, if the thickness of the cover layer is smaller than a standard, the collimate lens 6 is moved in the direction of the objective lens 9, that is, in an arrow-B direction so that the spherical aberration can be corrected.

The spherical aberration detection unit 32 detects the amount of spherical aberration from a predetermined signal obtained from the signal generation circuit 14, but if the spherical aberration detection unit 32 is configured to detect a jitter value included in the RF signal, for example, the lens control unit 31 is configured to control so that the collimating lens 6 is displaced to a position at which the jitter value detected by the spherical aberration detection unit 32 is an optimal value, and if the spherical aberration detection unit 32 is configured to detect a level of the RF signal, for example, the lens control unit 31 is configured to control so that the collimating lens 6 is displaced to a position at which the level of the RF signal detected by the spherical aberration detection unit 32 is the maximum.

By such operations of displacing the collimating lens 6, the spherical aberration is controlled so as to be minimized which occurs at the spot of the laser light incident on the objective lens 9 to be applied to the desired recording layer of the optical disc D.

The pickup control microcomputer 19 includes a position counter 33 and a RAM 34 (storage unit), and the driving pulse number corresponding to a distance from the reference position indicating positional information of the collimating lens 6 that is controlled by the lens control unit 31 while the power is on, is stored in the RAM 34 as a count value Cp counted by the position counter 33. The count value Cp when the collimating lens 6 is at the reference position is "0", and the count value Cp is incremented by "+1" each time 1 pulse (1 excitation pattern) is generated of the driving pulse for rotating the stepping motor 24 in the CW direction (such a direction as to move the collimating lens 6 toward the objective lens), while the count value Cp is decremented by "−1" each time 1 pulse (1 excitation pattern) is generated of the driving pulse for rotating the stepping motor 24 in the CCW direction (such a direction as to move the collimating lens 6 away from the objective lens).

As mentioned above, the positional information on the current location of the collimating lens 6 is stored in the RAM 34 as the count value Cp obtained by counting the driving pulse number from the reference position.

If recording or reproducing for the optical disc D is stopped by a stop operation or the like or the optical disc apparatus becomes in a sleep state where recording/reproducing for the optical disc D is not performed for a predetermined time, the optical disc apparatus stops rotation of the optical disc D to become in a spin-down state.

If the spin-down state is detected, the lens control unit 31 starts control so as to displace the collimating lens 6 to the standby position Pw (second position), that is, the collimating lens 6 is set so as to be displaced to the standby position Pw in the spin-down state.

The standby position Pw is set at a boundary position, which is the farthest position from the reference position Pd, of a movable range of the collimating lens 6 including all the movable required range of the collimating lens 6 assumed from the optical design of the optical pickup, within the mechanical movable limit of the collimating lens 6 in the lens driving mechanism.

That is, the standby position Pw is set at a boundary position of the movable range of the collimating lens 6 farther from the reference position Pd than that of the movable required range of the collimating lens 6 that is further added with a movable limit for displacement for correcting the spherical aberration, in a state where the collimating lens 6 has been displaced to be suitable for the recording layer L1 which is arranged more side from the laser-light incident surface of the of the optical disc D as compared with the recording layer L0. Thus, the displacement position of the collimating lens 6 farthest from the reference position Pd by the lens control unit 31 is set at the standby position Pw, and the collimating lens 6 is controlled so as not to be displaced to a position away from the reference position Pd beyond the standby position Pw.

If the spin-down state is detected, numerical data is read from the ROM 35 (storage unit) included in the pickup control microcomputer 19, in which the numerical data is stored in advance of the standby position Pw corresponding to the driving pulse number of the stepping motor 24 that is required for displacement in distance from the reference position Pd to the standby position Pw, and on the other hand, the numerical data of a current position Px is read from the RAM 34, which is stored as the count value Cp of the driving pulse number of the stepping motor 24 corresponding to the current position Px of the collimating lens 6, and then, a difference between the numerical data of the standby position Pw and the numerical data of the current position Px is calculated, to detect the driving pulse number of the stepping motor 24 that is required for displacement from the current position Px to the standby position Pw.

The lens control unit 31 generates the driving pulse in the CW direction from the motor driving circuit 30 on the basis of the driving pulse number detected as above, and displaces the collimating lens 6 to the standby position Pw.

Subsequently, there will be described, using a flowchart in FIG. 5, initialization processing of displacing the collimating lens 6 to the start position Ps on the basis of the control by the lens control unit 31.

When the optical disc apparatus is re-started by a power supply being turned on or the spin-down state being cancelled where the rotation of the optical disc D is stopped, the initialization processing of the collimating lens 6 is started, it is judged whether the count value Cp stored in the RAM 34, which indicates the current position Px of the collimating lens 6, is not "0", and presence or absence of position information of the collimating lens 6 is determined (Step a).

The position information on the current position Px of the collimating lens 6 is stored in the RAM 34 as the count value Cp, which is counted by the position counter 33 as the driving pulse number from the reference position Pd. Thus, the current position Px of the collimating lens 6 can be grasped from the count value Cp stored in the RAM 34, and it is possible to displace the collimating lens 6 to a predetermined position on the basis of the current position Px of the collimating lens 6.

Immediately after the power supply is turned on and immediately after the spin-down state is cancelled, data of the count value Cp in the RAM 34 indicating the displacement position of the collimating lens 6 has been cleared, and the count value Cp is judged as "0". Thus, it is judged that the initialization processing of the collimating lens 6 has not been executed.

If the initialization processing of the collimating lens 6 is started and the count value Cp stored in the RAM 34 is judged as "0" in the processing at Step a, the collimating lens 6 is driven so as to be displaced to the reference position Pd.

The collimating lens 6 is driven to return to the reference position Pd under the control by the lens control unit 31. The numerical data on the standby position Pw, which corresponds to the driving pulse number of the stepping motor 24 required for displacement in distance between the reference position Pd and the standby position Pw, is read from the ROM 35 in the pickup control microcomputer 19, and the lens control unit 31 generates the driving pulse in the CCW direction from the motor driving circuit 30 on the basis of the driving pulse number that corresponds to the numerical data on the standby position Pw, to drive the collimating lens 6 so as to be displaced to the reference position Pd (Step b).

Here, the driving pulse in the CCW direction generated by the lens control unit 31 from the motor driving circuit 30 is set to the driving pulse number (L+3) obtained by adding 3 pulses to the required driving pulse number L that is to be converted into a distance for returning from the standby position Pw to the reference position Pd. Such setting of the driving pulse number takes into consideration that a theoretical operation start has an error of from −2 pulses to +1 pulse, that is, a displacement error of the driving distance for 3 pulses of the collimating lens 6, which is caused by the stepping motor 24 being driven by the two-phase excitation method. The pulse number added to the driving pulse number L is not limited to 3 pulses as above, but may be any pulse number as long as it is the pulse number, with which a mechanical load applied to the lens driving mechanism is within an allowable range when the aberration correction lens is returned to the reference position.

Therefore, the collimating lens 6 at the standby position Pw is reliably returned to the reference position Pd even if an operation start of the stepping motor 24 is delayed.

Due to the operation-start error of 3 pulses at the maximum, which might occur when the collimating lens 6 is displaced to the standby position Pw, a displacement error of from −2 pulses to +1 pulse occurs at the standby position Pw with respect to the calculated number L of the driving pulse corresponding to the distance from the reference position Pd to the standby position Pw, and thus, the driving pulse number results in (L−2) to (L+1) at the standby position Pw to which the collimating lens 6 has been actually displaced. The pulse number for returning the collimating lens 6 from the standby position Pw to the reference position Pd is (L+3), and the actual displacement corresponds to (L+1) to (L+4) pulses, and thus, if the collimating lens 6 is driven so as to be returned from the standby position Pw to the reference position Pd, the feeding member 26 is pressed onto the one pivotal supporting portion 27a of the shaft supporting plate 27 by the driving amount of 0 to 6 driving pulses toward the mechanical movable limit in the CCW direction of the lens driving mechanism, and the collimating lens 6 is displaced to the reference position Pd. That is, when the collimating lens 6 is displaced to the reference position Pd, a load is applied, which is to be pressed onto the lens driving mechanism by an amount of 0 to 6 driving pulses (3 driving pulses on an average), but such degree of load does not adversely affect the lens driving mechanism.

On the other hand, in an abnormal state where the spin-down operation is not performed but the power supply is turned off, if the power supply is turned on again, the driving pulse number corresponding to the distance from the reference position Pd indicating the position information of the collimating lens 6 is not stored in the RAM 34 as the count value Cp. Thus, such control as to return the collimating lens 6 to the reference position Pd without displacing it to the standby position Pw is performed under the control by the lens control unit 31, and the driving pulse is generated from the motor driving circuit 30, which corresponds to the driving pulse number (L+3) obtained by adding 3 pulses to the calculated driving pulse number L required for returning the collimating lens 6 from the standby position Pw to the reference position Pd.

Since the current position of the collimating lens 6 is any position within a range from the reference position Pd to the standby position Pw at the time when the power supply was turned off and the driving pulse corresponding to the driving pulse number (L+3) is generated from the motor driving circuit 30, the driving amount, which corresponds to the driving pulses according to the difference between the current position and the standby position Pw of the collimating lens 6, is added as a load to be pressed onto the lens driving mechanism, and at the maximum, all of the driving pulse number (L+3) for returning from the standby position Pw to the reference position Pd becomes a load to be pressed onto the lens driving mechanism. However, since the position farthest from the reference position Pd is the standby position Pw, the collimating lens 6 can be reliably returned to the reference position Pd.

Also, since it is assumed that such an abnormal state rarely occurs that the power supply is turned off without the spin-down operation being performed, this abnormal state adversely affects the lens driving mechanism in a slight manner.

When the collimating lens 6 is returned to the reference position Pd, the count value Cp of the position counter 33 is reset to "0" (Step c).

Thereafter, the collimating lens 6 is driven so as to be displaced to the start position Ps which is set in advance (Step d). This start position Ps is set at the L0 suitable position P10 that is suitable for recording/reproducing for the recording layer L0 of the optical disc D, which is the same as the optical disc D having one layer of a thickness of the cover layer from the incident surface of the laser light to the recording layer (signal layer) of the optical disc D, for example, and if the start position Ps is set as above, the displacement of the collimating lens 6 can be reduced when the recording/reproducing is started so that it is advantageous in higher speed performance, which is preferable.

When the collimating lens 6 is displaced to the start position Ps, the driving pulse, which corresponds to the driving pulses Ls according to the difference between the reference position Pd and the start position Ps, is generated from the motor driving circuit 30, to drive the collimating lens 6.

When the collimating lens 6 is displaced to the start position Ps, the initialization processing is finished, to be shifted to another processing such as recording/reproducing processing for controlling recording/reproducing for the optical disc D. In the recording/reproducing processing, there is performed processing of selecting the recording layer L0 or the recording layer L1 for recording/reproducing for the optical disc D or aberration correction processing of displacing the collimating lens 6 to an optimal position with respect to the selected recording layer L0 or the recording layer L1.

On the other hand, if it is judged that the count value Cp is not "0" that is stored in the RAM 34 by the processing at Step a and it is judged that information on the current position Px of the collimating lens 6 is present, since the current position Px of the collimating lens 6 can be grasped from the count value Cp, the collimating lens 6 is not driven to return to the reference position Pd this time, but such control is performed as to directly displace the lens to the start position Ps. Such displacement of the collimating lens 6 to the start position Ps is performed by calculating the difference between the numerical data of the start position Ps read from the ROM 35 and the numerical data of the current position Px read from the RAM 34 and by detecting the driving pulse number of the stepping motor 24 required for displacing the lens from the current position Px to the start position Ps (Step e).

Figure 5:
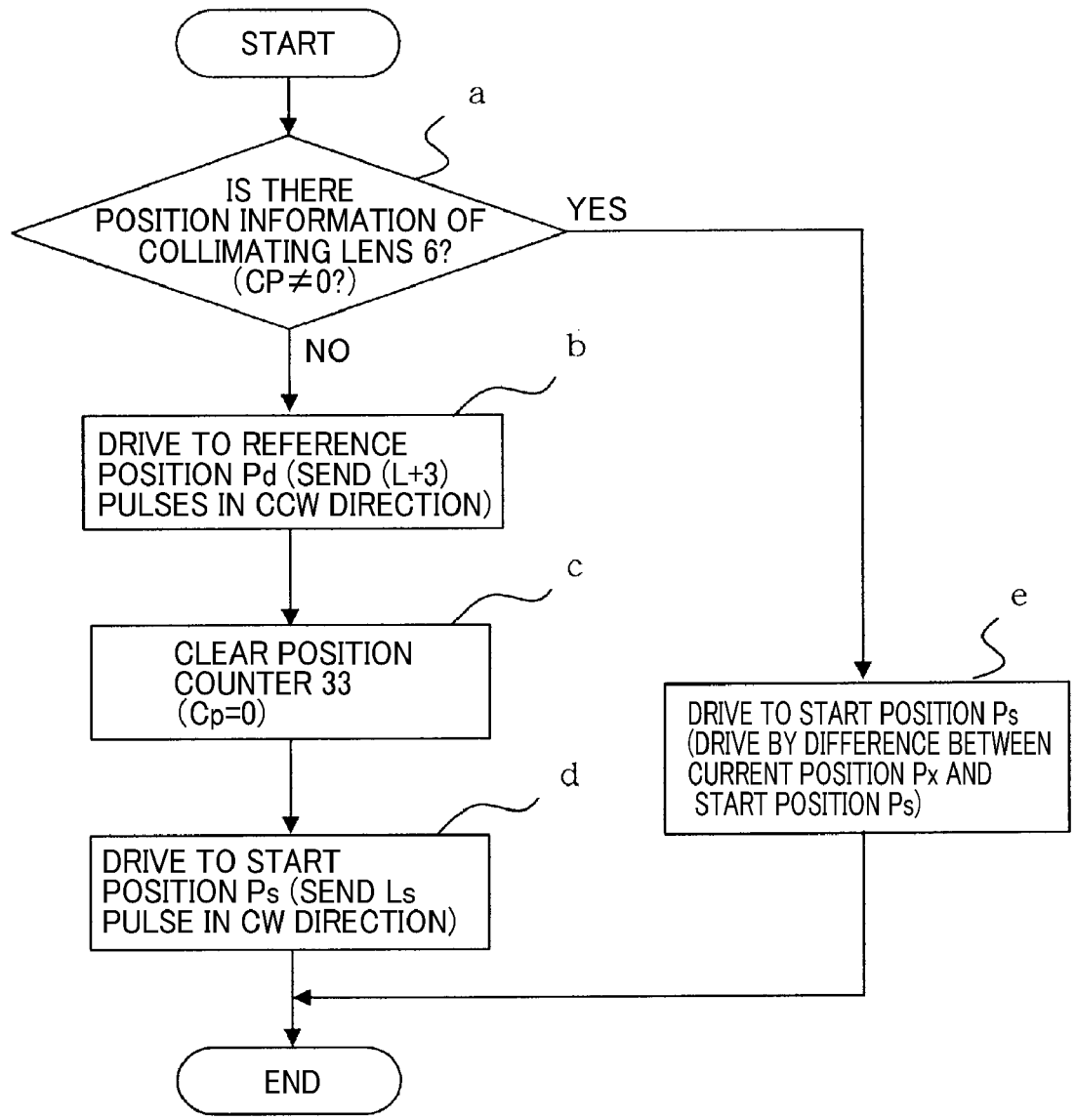
FIG. 5 is a flowchart illustrating an example of an initialization procedure of a collimating lens 6 in Embodiment 1.

When the collimating lens 6 is displaced to the start position Ps as such, the initialization processing shown in FIG. 5 is finished.

Figure 6:
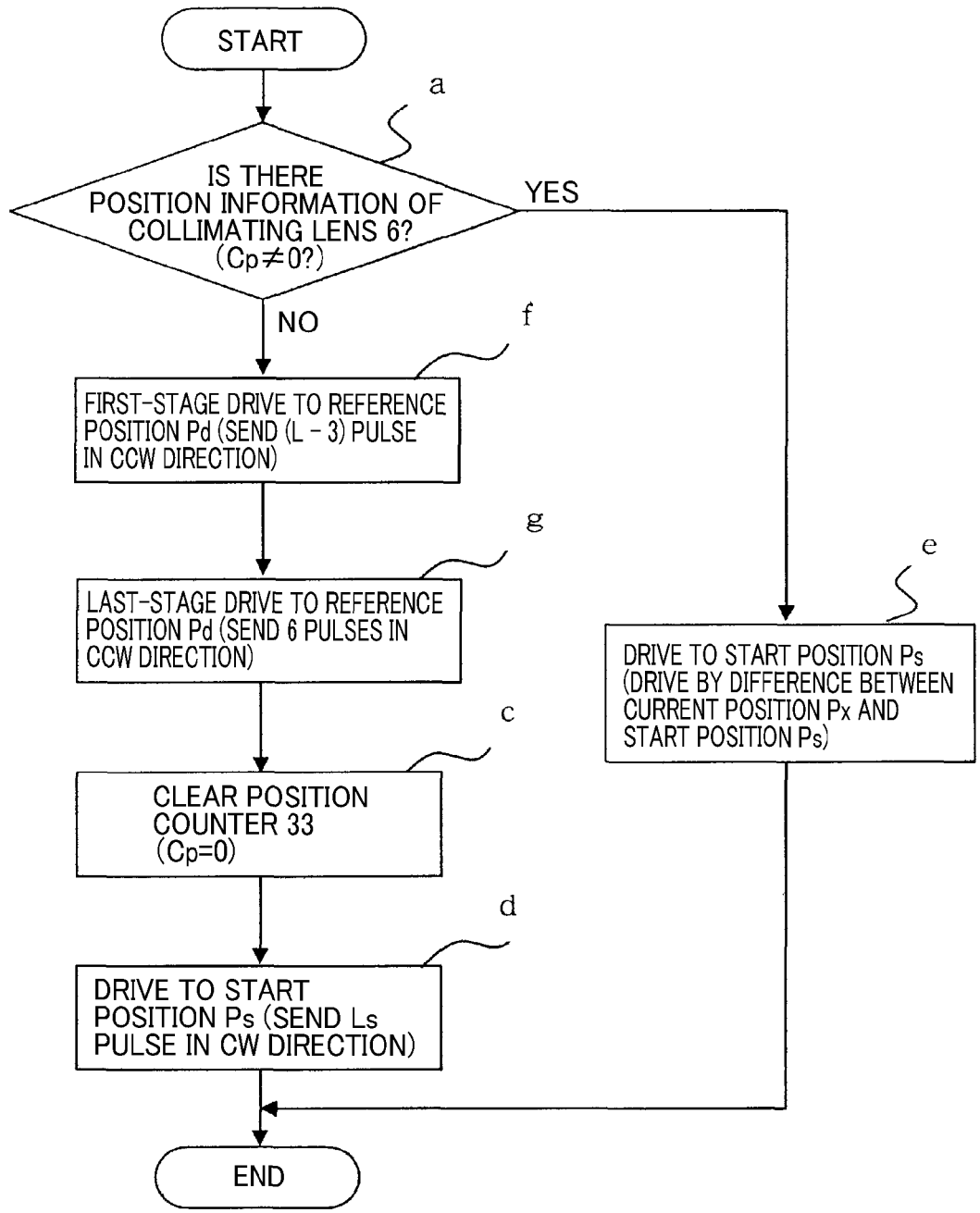
FIG. 6 is a flowchart illustrating another example of an initialization procedure of a collimating lens 6 in Embodiment 1.

FIG. 6 is a flowchart illustrating another example of the initialization procedure of the collimating lens 6 which is different from that in FIG. 5.

FIG. 6 is different in the procedure at Step b in FIG. 5 in which the collimating lens 6 is driven to the reference position Pd, while the same processing is performed at Step a and Steps c to e. In FIG. 6, the driving processing of the collimating lens 6 is as illustrated in Step f and Step g.

The driving pulse in the CCW direction, which is generated by the lens control unit 31 from the motor driving circuit 30 so as to drive the collimating lens 6 to the reference position Pd, is controlled with the pulse width being switched in two stages, so that the collimating lens 6 is driven in two stages, that is, a normal speed and a low speed that is lower than the normal speed.

The collimating lens 6 is set to be driven at the normal speed till the driving pulse number reaches (L−3) obtained by subtracting 3 pulses, which is a displacement error of the driving distance of the collimating lens 6, from the calculated number L of the driving pulse required for returning the lens from the standby position Pw to the reference position Pd, and the lens is set to be driven at the low speed by an amount of 6 driving pulses, by which the collimating lens 6 can be reliably returned from the standby position Pw to the reference position Pd, from beyond the driving pulse number (L−3) to the driving pulse number (L+3), even if a displacement error of the driving distance occurs.

Thus, if the displacement position of the collimating lens 6 is set at the standby position Pw when the collimating lens 6 is started to be driven to return to the reference position Pd, the collimating lens 6 is driven in a first stage at the normal speed till the driving pulse number reaches (L−3), which is immediately before the lens reaches the reference position Pd (Step f), and thereafter, the collimating lens 6 is driven to be pressed onto the lens driving mechanism in the last stage at the low speed, thereby being displaced to the reference position Pd (Step g). That is, the distance for the collimating lens 6 to return to the reference position Pd in a stepwise manner is gradually reduced.

Therefore, the load can be reduced, which is to be pressed onto the lens driving mechanism by an amount of 0 to 6 driving pulses (3 driving pulses on an average) when the collimating lens 6 is displaced to the reference position Pd.

Alternatively, it becomes possible to drive the collimating lens 6 faster by increasing the normal speed in a state where the load applied to the lens driving mechanism is maintained in an allowable range.

Embodiment 2

In Embodiment 1, the case has been described where the initial excitation pattern at the start of generation of the driving pulse generated by the motor driving circuit 30 is not set in a fixed manner, however in this embodiment, will be described at the start when the collimating lens 6 is started to be driven to return to the reference position Pd by the initialization processing of the collimating lens 6, a case will be described where the initial excitation pattern at the start of generation of the driving pulse generated by the motor driving circuit 30 is set in a fixed manner.

In an embodiment according to the present invention as well, the explanatory diagram illustrated in FIG. 1 is applied to the circuit block illustrating the circuit configuration of the optical disc apparatus and the optical system of the optical pickup, the configuration diagram illustrated in FIG. 2 is applied to the lens driving mechanism, the explanatory diagram illustrated in FIG. 3 is applied to the movable range of the collimating lens 6, and the explanatory diagram illustrated in FIG. 4 is applied to the excitation pattern of the driving pulse driving the stepping motor 24.

Figure 7:
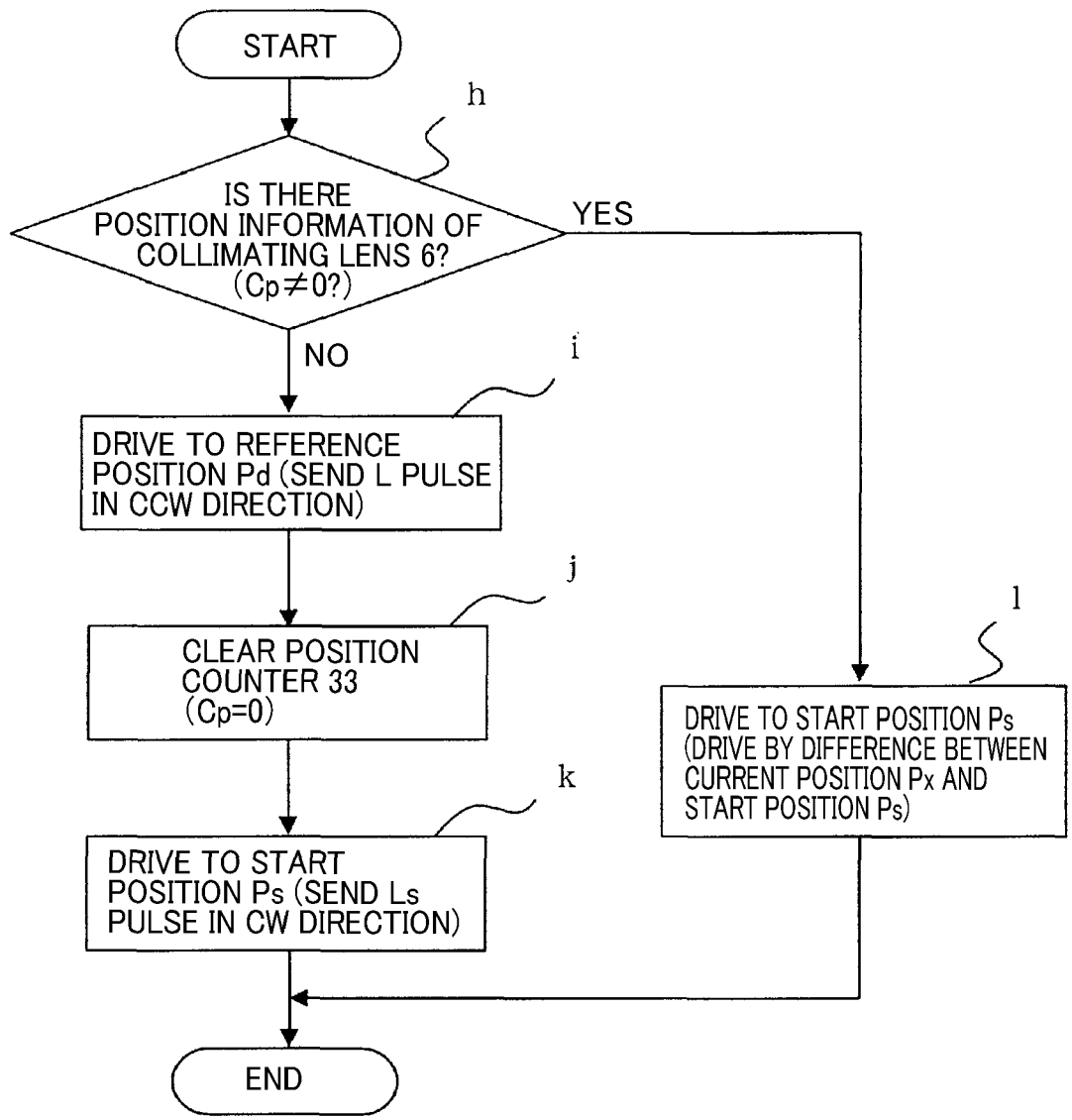
FIG. 7 is a flowchart illustrating an example of an initialization procedure of a collimating lens 6 in Embodiment 2.

The initialization processing of the collimating lens 6 under the control by the lens control unit 31 is performed by a procedure illustrated in a flowchart in FIG. 7.

When the optical disc apparatus is re-started by the power supply being turned on or the spin-down state being cancelled where the rotation of the optical disc D is stopped, the initialization processing of the collimating lens 6 is started, it is judged whether the count value Cp stored in the RAM 34, which indicates the current position Px of the collimating lens 6, is not "0", and presence or absence of position information of the collimating lens 6 is determined (Step h).

The position information on the current position Px of the collimating lens 6 is stored in the RAM 34 as the count value Cp, which is counted by the position counter 33 as the driving pulse number from the reference position Pd. Thus, the current position Px of the collimating lens 6 can be grasped from the count value Cp stored in the RAM 34, and it is possible to displace the collimating lens 6 to a predetermined position on the basis of the current position Px of the collimating lens 6.

Immediately after the power supply is turned on, data of the count value Cp in the RAM 34 indicating the displacement position of the collimating lens 6 has been cleared, and the count value Cp is judged as "0". Thus, it is judged that the initialization processing of the collimating lens 6 has not been executed.

If the initialization processing of the collimating lens 6 is started and the count value Cp stored in the RAM. 34 is judged as "0" in the processing at Step h, the collimating lens 6 is driven so as to be displaced to the reference position Pd.

The collimating lens 6 is driven to return to the reference position Pd under the control by the lens control unit 31. The numerical data on the standby position Pw, which corresponds to the driving pulse number of the stepping motor 24 required for displacement in distance between the reference position Pd and the standby position Pw, is read from the ROM 35 in the pickup control microcomputer 19, and the lens control unit 31 generates the driving pulse in the CCW direction from the motor driving circuit 30 on the basis of the driving pulse number that corresponds to the numerical data on the standby position Pw, to drive the collimating lens 6 so as to be displaced the lens to the reference position Pd (Step i).

Here, the standby position Pw is set at a boundary position, which is the farthest position from the reference position Pd, of a movable range of the collimating lens 6 including all the movable required ranges of the collimating lens 6 assumed from the optical design of the optical pickup, and set at a distance for the lens to be driven by the driving pulse number L in the CW direction from the reference position Pd, within the mechanical movable limit of the collimating lens 6 in the lens driving mechanism (See FIG. 3).

The driving pulse in the CCW direction generated by the lens control unit 31 from the motor driving circuit 30 is set to the required driving pulse number L that is to be converted into the distance for returning from the standby position Pw to the reference position Pd.

Also, when the collimating lens 6 is started to be driven to return to the reference position Pd, the initial excitation pattern at the start of generation of the driving pulse 31 is set in a fixed manner by the lens control unit 31 in the motor driving circuit 30 . That is, at the start of the initialization processing of the collimating lens 6, the collimating lens 6 is started to be driven to return to the reference position Pd in such a manner that the initial excitation pattern of the driving pulse generated from the motor driving circuit 30 is fixed to any of the four excitation patterns 1, 2, 3, and 4 illustrated in FIG. 4, for example, the excitation pattern 1.

As will be described later, at the time of ordinary power-off, the collimating lens 6 is displaced to the standby position Pw after the spin-down processing has been performed, and thus, even at the time of power on thereafter, the collimating lens 6 is still in a state where it has been displaced to the standby position Pw. The excitation pattern at the standby position Pw is the same as the initial excitation pattern at the power-on, which is the fixed excitation pattern, and therefore in this case, after the power-on, the error of from −2 pulses to +1 pulse of the driving pulse number does not occur, which is caused by the stepping motor 24 for displacing the collimating lens 6 being driven by the two-phase excitation method at the start of the operation.

Therefore, the collimating lens 6 at the standby position Pw is returned by the driving pulse number L to be displaced to the reference position Pd without delay in start of operation of the stepping motor 24.

When the collimating lens 6 is returned to the reference position Pd, the count value Cp of the position counter 33 is reset to "0" (Step j).

Thereafter, the collimating lens 6 is driven so as to be displaced to the start position Ps which is set in advance (Step k). This start position Ps is set at the L0 suitable position P10 that is suitable for recording/reproducing for the recording layer L0 of the optical disc D, which is the same as the optical disc D having one layer of a thickness of the cover layer from the incident surface of the laser light to the recording layer (signal layer) of the optical disc D, for example, and if the start position Ps is set as above, the displacement of the collimating lens 6 can be reduced when the recording/reproducing is started, so that it is advantageous in higher speed performance.

When the collimating lens 6 is displaced to the start position Ps, the driving pulse for driving in the CW direction, which corresponds to the driving pulse number Ls according to the difference between the reference position Pd and the start position Ps, is generated from the motor driving circuit 30, to drive the collimating lens 6.

On the other hand, if it is judged that the count value Cp is not "0" that is stored in the RAM 34 by the processing at Step h and it is judged that information on the current position Px of the collimating lens 6 is present, since the current position Px of the collimating lens 6 can be grasped from the count value Cp, the collimating lens 6 is not driven to return to the reference position Pd this time, but such control is performed as to directly displace the lens to the start position Ps. Such displacement of the collimating lens 6 to the start position Ps is performed by calculating the difference between the numerical data of the start position Ps read from the ROM 35 and the numerical data of the current position Px read from the RAM 34 and by detecting the driving pulse number of the stepping motor 24 required for displacing the lens from the current position Px to the start position Ps (Step l).

The start position Ps of the collimating lens 6 is not set a position at which the lens is displaced from the reference position Pd by an amount of the fixed driving pulse number, but in general, is adjusted in each optical pickup so as to accommodate variation.

As above, the collimating lens 6 is displaced to the start position Ps, and the initialization processing illustrated in FIG. 7 is finished. After the initialization processing is finished, the collimating lens 6 is driven under the control by the lens control unit 31, and displaced corresponding to the recording layer L0 or L1 for recording/reproducing for the optical disc D, or displaced to correct the spherical aberration by the aberration correction processing so that the quality of the laser light applied to the recording layer L0 or L1 becomes appropriate, within the range from the reference position Pd to the standby position Pw.

When the spin-down state is brought about where the rotation of the optical disc D is stopped and this spin-down state is detected, the lens control unit 31 starts such control as to displace the collimating lens 6 to the standby position Pw, and in the spin-down state, the collimating lens 6 is displaced to the standby position Pw. Such displacement of the collimating lens 6 to the standby position Pw is performed by calculating the difference between the numerical data of the standby position Pw read from the ROM 35 and the numerical data of the current position Px read from the RAM 34 and by detecting the driving pulse number of the stepping motor 24 required for displacing the lens from the current position Px to the standby position Pw.

As mentioned above, the standby position Pw is set at a distance for the lens to be driven by the driving pulse number L in the CW direction from the reference position Pd. When the power supply is on, the lens is driven to the reference position Pd (Step i) to be driven by the pulse number L in the CCW direction, and in the spin-down state, the lens is displaced to the standby position Pw to be displaced to the position at which the lens is driven by the pulse number L in the CW direction from the reference position Pd. Thus, the excitation pattern at the standby position Pw is the same as the initial excitation pattern when the power is on. Also, the initial excitation pattern when the power is on is set to a fixed excitation patter as mentioned above.

In a state where the collimating lens 6 has been displaced to the reference position Pd by the processing at Step i, the excitation pattern of the driving pulse that is suitable for the rotation angle of the stepping motor 24 varies among lens driving mechanisms with individual variations thereof.

Thus, when the collimating lens 6 is driven in the CW direction by the processing at Step k so as to be displaced from the reference position Pd to the start position Ps, the displacement error of from −2 pulses to +1 pulse occurs in the driving distance of the collimating lens 6, which is caused by the stepping motor 24 being driven by the two-phase excitation method with the individual variations of the lens driving mechanisms.

The displacement error of +1 pulse means that the collimating lens 6 is moved by an amount of 1 pulse in the CW direction by the initial excitation (excitation pattern at the reference position Pd) and performs the second-pulse operation by the excitation of the first driving pulse; and the displacement error of −2 pulses means that the collimating lens 6 is not displaced by the initial excitation, and is to be displaced in the CCW direction but is not displaced due to the movable limit MB0 of the lens driving mechanism on the first driving pulse, the excitation pattern becomes the pattern suitable for the position where the lens abuts on the limit on the second pulse, and the lens is moved by an amount of 1 pulse in the CW direction for the first time on the third pulse. Since the initial excitation pattern when the power is on is the same all the time, and the pulse number for driving the lens in the CCW direction at Step i is also constant all the time, the excitation pattern at the reference position Pd is also the same all the time. Therefore, the displacement error is constant all the time among the individual lens driving mechanisms and has reproducibility.

As mentioned above, when the collimating lens 6 is driven in the CW direction from the reference position Pd, the displacement error of from −2 pulses to +1 pulse occurs in the driving distance of the collimating lens 6. Therefore the standby position Pw to which the collimating lens 6 is displaced in the spin-down state is set at the position distanced from the reference position Pd by an amount of the pulse number L, however in reality, the position is set at the position distanced from the reference position Pd by an amount of the pulse number (L−2) to (L+1) with the variations of the lens driving mechanisms.

Thus, when the collimating lens 6 is driven to return from the standby position Pw to the reference position Pd by the driving pulse of an amount of the pulse number L (Step i), states where the lens is driven to the reference position Pd vary with the individual lens driving mechanisms. If the standby position Pw is set at the position distanced from the reference position Pd by an amount of the pulse number(L−2), the collimating lens 6 is pressed onto the lens driving mechanism by an amount of 2 pulses and displaced to the reference position Pd; if the standby position Pw is set at the position distanced from the reference position Pd by an amount of the pulse number (L−1), the collimating lens 6 is pressed onto the lens driving mechanism by an amount of 1 pulse and displaced to the reference position Pd; and if the standby position Pw is set at the position distanced from the reference position Pd by an amount of the pulse number L, the collimating lens 6 reaches the mechanical movable limit of the lens driving mechanism and is displaced to the reference position Pd. If the standby position Pw is set at the position distanced from the reference position Pd by an amount of the pulse number (L+1), the collimating lens 6 is displaced to the reference position Pd, which is the reference position Pd positioned 1-pulse frontward with respect to the mechanical movable limit of the lens driving mechanism.

Therefore, if the collimating lens 6 is driven so as to return from the standby position Pw to the reference position Pd, the feeding member 26 is pressed onto the one pivotal supporting portion 27a of the shaft support plate 27 by the driving amount of 0 to 2 pulses toward the mechanical movable limit in the CCW direction of the lens driving mechanism, and the collimating lens 6 is displaced to the reference position Pd. That is, when the collimating lens 6 is displaced to the reference position Pd, a load is applied, which is to be pressed by an amount of 2 pulses to the lens driving mechanism at the maximum, but such degree of load does not adversely affect the lens driving mechanism.

On the other hand, in an abnormal state where the spin-down operation is not performed but the power supply is turned off, when the power supply is turned on again and the driving pulse corresponding to the calculated driving pulse number L required for returning the collimating lens 6 from the standby position Pw to the reference position Pd is generated from the motor driving circuit 30 (Step i), the current position of the collimating lens 6 is any position in a range from the reference position Pd to the standby position Pw at the time when the power was turned off, and thus, when the driving pulse corresponding to the driving pulse number L is generated from the motor driving circuit 30, the driving amount, which corresponds to the driving pulse according to the difference between the current position and the standby position Pw of the collimating lens 6, is added as a load to be pressed onto the lens driving mechanism, and at the maximum, all of the driving pulse number L for returning from the standby position Pw to the reference position Pd becomes a load to be pressed onto the lens driving mechanism. However, since the position farthest from the reference position Pd is the standby position Pw, the collimating lens 6 can be reliably returned to the reference position Pd.

Even if the collimating lens 6 has been displaced to a position other than the standby position Pw when the power is turned on as above, the initial excitation pattern when the power is on is the same all the time, and the pulse number for driving the lens in the CCW direction at Step i is also constant all the time. Thus, the excitation pattern at the reference position Pd is the same all the time, and the above-mentioned displacement error is constant all the time among individual lens driving mechanisms and has the same repeatability as that in the case of the normal operation where the collimating lens 6 is displaced to the standby position Pw when the power is on.

Since it is assumed that such an abnormal state rarely occurs that the power supply is turned off without the spin-down operation being performed, this abnormal state adversely affects the lens driving mechanism in a slight manner.

Figure 8:
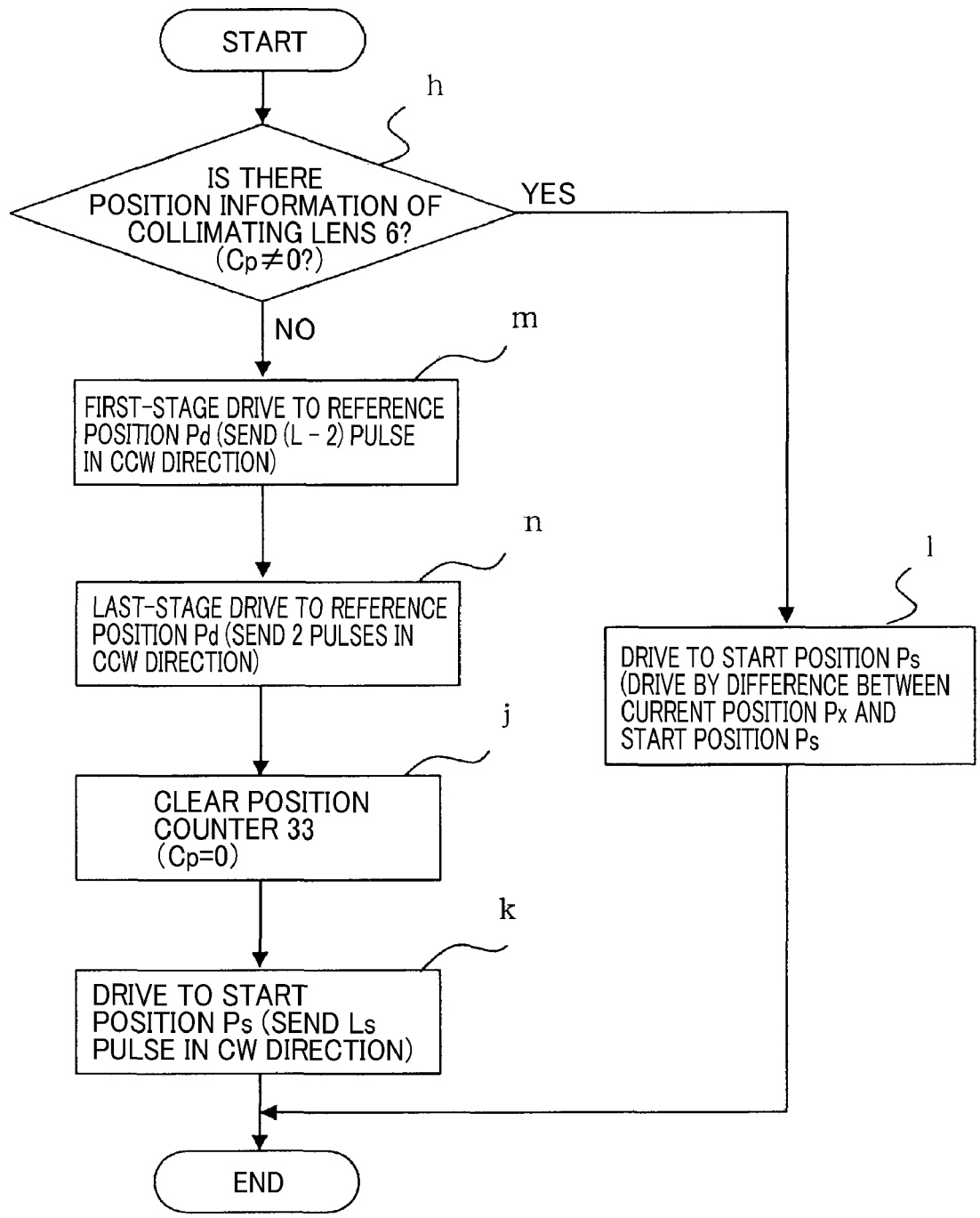
FIG. 8 is a flowchart illustrating another example of an initialization procedure of a collimating lens 6 in Embodiment 2.

FIG. 8 is a flowchart illustrating another example of the initialization procedure of the collimating lens 6 different from that in FIG. 7.

FIG. 8 is different in the procedure at Step i in FIG. 7 in which the collimating lens 6 is driven to the reference position Pd, while the same processing is performed at Step h and Steps j to l. In FIG. 8, the driving processing of the collimating lens 6 is as illustrated in Step m and Step n.

The driving pulse in the CCW direction, which is generated by the lens control unit 31 from the motor driving circuit 30 so as to drive the collimating lens 6 to the reference position Pd, is controlled with the pulse width being switched in two stages, so that the collimating lens 6 is driven in two stages, that is, a normal speed and a low speed that is lower than the normal speed.

The collimating lens 6 is set to be driven at the normal speed till the driving pulse number reaches (L−2) obtained by subtracting 2 pulses, which is the maximum pulses to be pressed onto the lens driving mechanism when the collimating lens 6 is returned from the standby position Pw to the reference position Pd, from the calculated driving pulse number L required for returning the lens from the standby position Pw to the reference position Pd, and the lens is set to be driven at the low speed by an amount of 2 pulses from beyond the driving pulse number (L−2) to the driving pulse number L.

Thus, if the displacement position of the collimating lens 6 is at the standby position Pw when the collimating lens 6 is started to be driven to return to the reference position Pd, the collimating lens 6 is driven in the first stage at the normal speed till the driving pulse number reaches (L−2), which is immediately before the lens reaches the reference position Pd (Step m), and thereafter, the collimating lens 6 is driven to be displaced to the reference position Pd in the last stage at the low speed by an amount of 2 pulses (Step n). That is, the distance for the collimating lens 6 to return to the reference position Pd in a stepwise manner is gradually reduced.

Therefore, even if the collimating lens 6 is pressed onto the lens driving mechanism when it is displaced to the reference position Pd, the load of the collimating lens 6 to be pressed can be reduced.

Alternatively, it becomes possible to drive the collimating lens 6 faster by increasing the normal speed in a state where the load applied to the lens driving mechanism is maintained in an allowable range.

The optical disc apparatus in Embodiments 1 and 2 has been described using, as an example, an optical pickup employing the collimating lens 6 as a spherical aberration correction lens that corrects the aberration correction caused by a difference in thickness of the cover layer in the optical disc D by being displaced in the optical axis direction, however, the spherical aberration correction lens is not limited to the collimating lens, but may be an intermediate lens for adjusting a spread angle of the laser light or a lens making up a beam expander.

Moreover, the lens control unit 31, the spherical aberration detection unit 32, and the position counter 33 represent functions by software processing in the pickup control microcomputer 19, but they may be configured with hardware circuits or may be configured with a combination of the microcomputer and the hardware. If the position counter 33 is configured by hardware, the RAM 34 is not required for storing the count value.

The above embodiments of the present invention are simply for facilitating the understanding of the present invention and are not in anyway to be construed as limiting the present invention. The present invention may variously be changed or altered without departing from its spirit and encompass equivalents thereof.

In an embodiment described above, a two-layer optical disc is described as a target optical disc, for example, but this is not limited to the two-layer optical disc, and a multilayered optical disc such as a three-layer disc or four-layer disc may be used as the optical disc. Also, the optical disc to be supported is not limited to the Blu-ray Disc standard but may be any optical discs of various standards.

What is claimed is:

1. An optical disc apparatus comprising:
   a laser light source configured to emit laser light;
   an objective lens configured to allow the laser light to be applied to a recording layer of an optical disc;
   an aberration correction lens arranged in an optical path between the laser light source and the objective lens, the aberration correction lens configured to be moved in an optical axis direction according to a thickness of a cover layer of the optical disc from an incident face to the recording layer;
   a stepping motor configured to drive the aberration correction lens;
   a driving unit configured to generate a driving pulse for driving the stepping motor;
   a storage unit configured to store current position information of the aberration correction lens based on the number of the driving pulse; and
   a control unit configured to control the driving unit so that the aberration correction lens is moved between a first position set in a mechanical movable range of the aberration correction lens and a second position set on the objective lens side with respect to the first position,
   the control unit
      controlling the driving unit so that the aberration correction lens is moved to the second position, when rotation of the optical disc is stopped, and
      controlling the driving unit so that the aberration correction lens is moved to a start position between the first position and the second position according to the thickness of the cover layer based on the current position information of the aberration correction lens, when stop of the rotation of the optical disc is cancelled.

2. The optical disc apparatus according to claim 1, wherein the control unit
      controls the driving unit so that the aberration correction lens is directly moved to a start position between the first position and the second position according to the thickness of the cover layer based on the current position information of the aberration correction lens, if the storage unit stores the current position information of the aberration correction lens; and
      controls the driving unit so that the aberration correction lens is moved to the start position after having been moved to the first position if the storage unit does not store the current position information of the aberration correction lens,
   when the stop of the rotation of the optical disc is cancelled.

3. The optical disc apparatus according to claim 2, wherein the control unit controls the driving unit so that the aberration correction lens is moved to the start position after having been moved to the first position in a stepwise manner if the storage unit does not store the current position information of the aberration correction lens,
   when the stop of the rotation of the optical disc is cancelled.

4. The optical disc apparatus according to claim 3, wherein the control unit controls the driving unit so that a distance for the aberration correction lens to be moved to the first position in a stepwise manner is gradually reduced if the storage unit does not store the current position information of the aberration correction lens,
   when the stop of the rotation of the optical disc is cancelled.

5. The optical disc apparatus according to claim 1, wherein the start position is a position at which the laser light is not focused on the recording layer, and which is set in advance so that recording or reproducing for the recording layer is performed in an optimal manner.

6. The optical disc apparatus according to claim 1, wherein the first position is one of movable limit positions of the aberration correction lens, which is the farthest from the objective lens.

7. The optical disc apparatus according to claim 1, wherein the optical disc includes a plurality of recording layers having different cover-layer thicknesses; and wherein
   a focusing position of the aberration correction lens that is optimal for the laser light to be focused on each of the plurality of recording layers is set between the first position and the second position.

8. The optical disc apparatus according to claim 1, wherein the stepping motor includes a motor driven by a two-phase excitation method; wherein
   the storage unit stores information on the first position and the second position based on the number of the driving pulse; and wherein
   the control unit
      controls the driving unit so that the number of the driving pulse when the aberration correction lens is moved from the second position to the first position is greater by a predetermined number than a difference in the numbers of the driving pulses indicating the second position and the first position, if the aberration correction lens is moved to the start position after having been moved from the second position to the first position,
   when the stop of the rotation of the optical disc is cancelled.

* * * * *